United States Patent
Prakash

(10) Patent No.: US 7,706,004 B2
(45) Date of Patent: *Apr. 27, 2010

(54) APPARATUS AND SYSTEM FOR SCANNING MAINTENANCE PREDICTION

(75) Inventor: Ravinder Prakash, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 12/027,931

(22) Filed: Feb. 7, 2008

(65) Prior Publication Data

US 2008/0130067 A1 Jun. 5, 2008

Related U.S. Application Data

(63) Continuation of application No. 10/629,492, filed on Jul. 29, 2003, now Pat. No. 7,388,681.

(51) Int. Cl.
*H04N 1/04* (2006.01)

(52) U.S. Cl. ............... 358/1.14; 358/448; 358/468; 358/406

(58) Field of Classification Search ............ 358/1.14, 358/448, 468, 406
See application file for complete search history.

(56) References Cited

U.S. PATENT DOCUMENTS

| 5,687,250 | A | | 11/1997 | Curley et al. |
| 5,754,674 | A | | 5/1998 | Ott et al. |
| 5,963,654 | A | | 10/1999 | Prakash et al. |
| 6,016,204 | A | * | 1/2000 | Budnik et al. ............... 358/1.14 |
| 6,244,174 | B1 | * | 6/2001 | Sirowitzki et al. ........... 101/212 |
| 6,473,199 | B1 | | 10/2002 | Gilman et al. |

* cited by examiner

*Primary Examiner*—Houshang Safaipour
(74) *Attorney, Agent, or Firm*—Kunzler Needham Massey & Thorpe

(57) ABSTRACT

An apparatus for predicting when maintenance is required for a scanner comprises a tracking module configured to track a quality parameter history, a prediction module configured to predict when maintenance is required based on the quality parameter history, and a notification module configured to notify a user when maintenance is predicted to be required based on a quality parameter trend. The quality parameter is selected from a group consisting of an average brightness, a maximum brightness, a video gradient, and a contrast.

13 Claims, 6 Drawing Sheets

APPARATUS AND SYSTEM FOR SCANNING MAINTENANCE PREDICTION

CROSS-REFERENCES TO RELATED APPLICATIONS

This application is a continuation-in-part of and claims priority to U.S. Provisional patent application Ser. No. 10/629,492 entitled "System, Apparatus, and Method for Scanning Maintenance Prediction" and filed on Jul. 29, 2003 for Ravinder Prakash, which is incorporated herein by reference.

BACKGROUND OF THE INVENTION

1. Field of the Invention

This invention relates to the field of scanning images, and more particularly to tracking scanned image quality, predicting maintenance, and sending notification of when maintenance is needed.

2. Description of the Related Art

Electronic scanning of images is becoming more prevalent as an increasing number of paper processes are converted to electronic processes and as devices such as printers, fax machines, scanners, and copiers are integrated into a single device. Point of sale scanning is becoming increasingly popular to scan checks, lottery tickets, etc. in order to reduce labor-intensive processes related to handling paper copies. Scanning technologies are also becoming less expensive, which in turn contributes to the growing popularity.

As users become increasingly dependent on scanning technology, the reliability of scanning technology for producing an accurate electronic copy of an image, defined here as a "scanned image," is critical. Near-zero maintenance for the life of a scanner is also highly desirable. In applications where scanners are used continually, such as point-of-sale (POS) applications, maintenance may disrupt the use of the scanners and is therefore undesirable.

FIG. 1 depicts one embodiment of a conventional scanning system 10. The illustrated scanner 10 includes a transport 12 where a document 14 to be scanned is placed. The transport 12 may be fixed or moving as a document 14 is scanned.

As a document 14 is scanned, an illumination source 16, projects light off the document 14 along a scan line 18. The emitted optical rays pass through an imaging lens 20 to an array of sensors 22 and are then converted to a digital signal using an analog to digital converter 24.

The digital signal is stored in a computer memory 26 in the form of a scanned image matrix 28, where each picture element, or pixel, along a scan line represents a column of the scanned image matrix 28. As the document 14 is scanned, the transport 12 moves the image such that the scan line 18 moves, and a segment of the scanned document 14 is scanned creating a new row in the scanned image matrix. Alternatively, the document 14 is fixed on the transport 12 and the scan line 18 moves across the document 14. This routine is continued until the entire document 14 is scanned and an entire scanned image matrix 28 is created.

The information in the scanned image matrix 28 may be processed by a CPU 30 to form a processed image matrix 32, which is also stored in the memory 26. In one embodiment, elements of the scanned image matrix 28 are compared to a table assigned to each pixel 34 to determine a corresponding element in the processed image matrix 32. The table assigned to each pixel 34 is used to compensate for differences from one sensor to the next in the array of sensors 22 or for other slight differences between pixels in the scanning process. Values in the tables that are assigned to each pixel 34 are set during a calibration process. The calibration process will be discussed in greater detail below with reference to FIG. 4.

In general, the quality of scanned images can be monitored using control points within the scanning system or by monitoring the quality of the scanned image by analyzing the document 14 after it has been converted to an electronic form using the processed image matrix 32. Monitoring control points, such as low toner, paper jams, hardware failures, etc., within the scanning system are common and can determine failures of the hardware and software components. Unfortunately, analyzing control points cannot detect many problems such as accumulation of dust and debris, optical or electronic defocus, malfunctioning sensors for picture elements (pixels), and other hardware problems. If the scanner is used to transmit electronic images, a degraded scanned image may not be detected unless the recipient of the scanned image notifies the user of the scanner.

Periodic maintenance by a technician may be able to detect problems that are not detectable through simply monitoring control points. However, periodic maintenance requires the scanning system to be taken out of service during the maintenance. If periodic maintenance is done at regular intervals, maintenance can be scheduled to minimize impact on the scanner use, but the maintenance may be done too soon, before it is needed or too late, when the scanned images are unacceptable. If the user calls for maintenance due to poor quality scanned images, the user is more likely to be inconvenienced by having the scanner out of service.

The second method of monitoring quality of a scanned image is to analyze the document 14 after it has been converted to an electronic form using the processed image matrix 32. A process for analyzing the quality of a scanned image to identify unacceptable images is described in U.S. Pat. No. 5,963,654 issued to Prakash, et al. on Oct. 5, 1999. However, this patent only looks at scanned images on a case by case basis, does not track image quality history, and does not predict when maintenance is required.

What is needed is a process, apparatus, and system that are capable of tracking the quality of scanned images by tracking quality image history and using the quality history to send a notification and a prediction of when maintenance is required. Beneficially, such a process, apparatus, and system would call for maintenance of a scanner only when required and would decrease the down time of scanners during periods of required use, since maintenance could be scheduled before scanned images are too poor in quality to be used.

BRIEF SUMMARY OF THE INVENTION

The present invention has been developed in response to the present state of the art, and in particular, in response to the problems and needs in the art that have not yet been fully solved by currently available scanner technology diagnostics systems. Accordingly, the present invention provides a process, apparatus, and system for tracking quality of scanned images by tracking image quality history and using the image quality history to send a notification and a prediction of when maintenance is required that overcome many or all of the above-discussed shortcomings in the art.

The apparatus for scanning maintenance prediction is provided with a logic unit containing a plurality of modules configured to functionally execute the necessary steps of tracking image quality history, determining when to send for maintenance and sending a prediction of when maintenance is required. These modules in the described embodiments include a tracking module, a prediction module and a notification module.

The apparatus, in one embodiment, is configured to track image quality history in increments of time. The apparatus is further configured, in one embodiment, to track image quality history in increments of number of scanned images. In a further embodiment, the apparatus may be configured to track image quality history by tracking when a quality parameter crosses a threshold.

In a further embodiment, the apparatus may be configured to use a straight-line approximation function or a first order curve fitting function to extrapolate image quality history. In another embodiment, the apparatus may be configured to send a prediction of when maintenance is required.

A system of the present invention is also presented for tracking image quality history and predicting when maintenance is required. The system may be embodied by a computer network, a scanner connected to the computer network and configured to scan images and convert the scanned image to a digital format, each pixel of the scanned image corresponding to an element in a scanned image matrix, a server configured to control the computer network, a computer connected to the computer network, the computer configured to communicate with the scanner.

In particular, the scanning system, in one embodiment, includes a tracking module configured to track a quality parameter history, a prediction module configured to predict when maintenance is required based on quality parameter changes, and a notification module configured to notify a user when maintenance is predicted to be required based quality parameter changes. The quality parameter may be selected from a group consisting of an average brightness, a maximum brightness, a video gradient, and a contrast.

A process of the present invention is also presented for tracking image quality history and predicting when scanner maintenance is required. The process in the disclosed embodiments substantially includes the steps necessary to carry out the functions presented above with respect to the operation of the described apparatus and system. In one embodiment, the process includes tracking a quality parameter history, predicting when maintenance is required based on the quality parameter history, and notifying a user when maintenance is predicted to be required based on a quality parameter trend.

The step of tracking a quality adjustment history further comprises in one embodiment, recording a quality parameter history variable and a quality parameter time variable after a specified period of time, recording a quality parameter history variable and a quality parameter time variable after a specified number of images have been scanned, or modifying a quality parameter history variable by an amount that a quality parameter variable is different than a quality parameter threshold and recording a quality parameter time variable when the quality parameter change variable is modified.

The step of predicting when maintenance is required, in one embodiment, comprises using a quality parameter history variable and a quality parameter time variable in a quality parameter function to determine a quality parameter trend and extrapolate the trend to determine when the quality parameter trend will cross an quality parameter notification limit, when the quality parameter trend will cross a quality parameter change limit, and the time difference between when the quality parameter trend will cross the quality parameter notification limit and the quality parameter change limit.

In one embodiment, the quality parameter function comprises a quality parameter straight-line approximation function configured to determine a straight-line approximation of the quality parameter trend. In another embodiment, the quality parameter function comprises a quality parameter first order curve fitting approximation function configured to determine a curved-line approximation of the quality parameter trend.

The step of notifying a user when maintenance is predicted to be required, in one embodiment, further comprises sending a notification signal when a quality parameter trend crosses a quality parameter notification limit, the notification signal comprising an estimated time difference between when the quality parameter trend crosses the quality parameter notification limit and when the quality parameter trend crosses a quality parameter change limit. In one embodiment, the quality parameter is selected from a group consisting of an average brightness, a maximum brightness, a video gradient, and a contrast.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
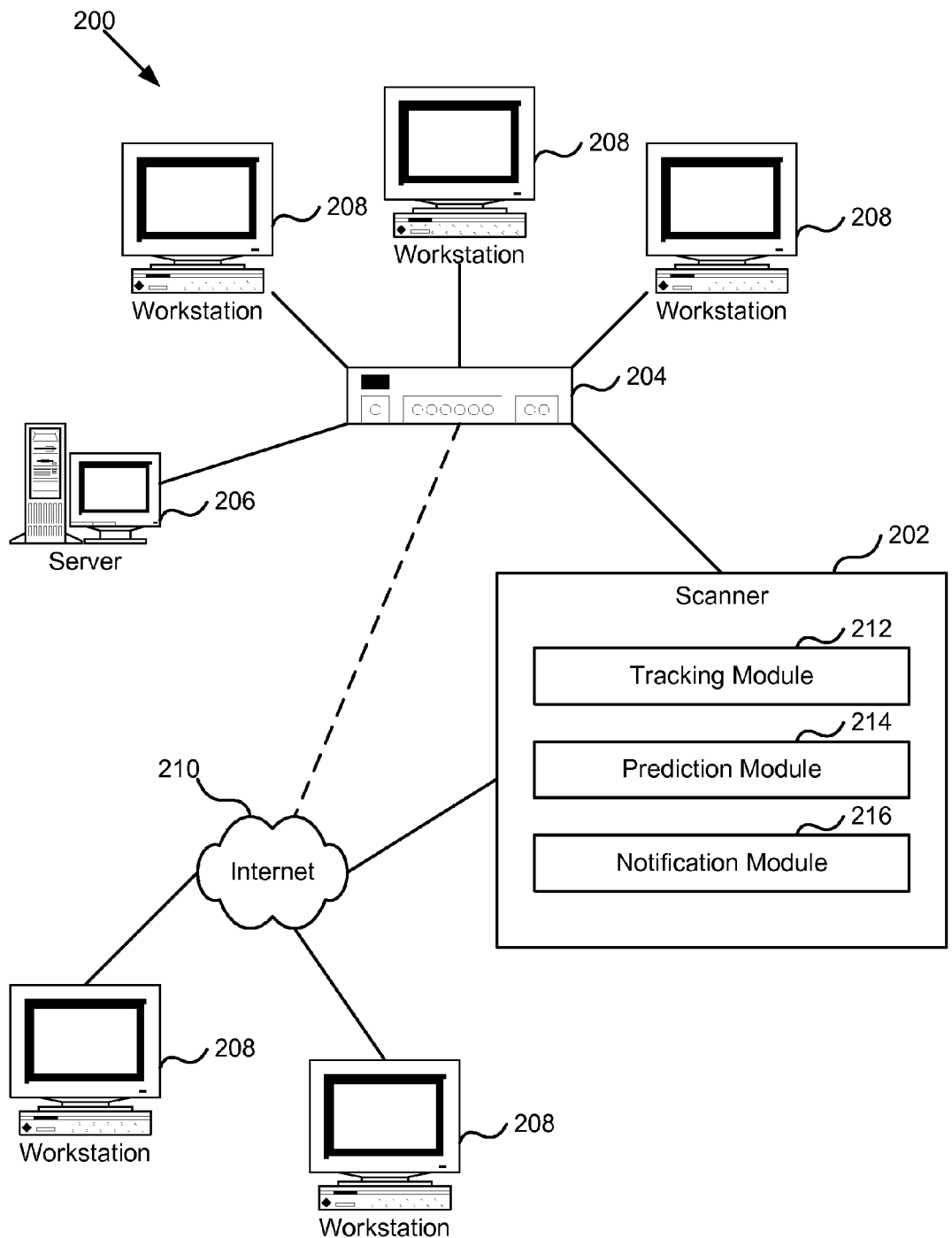
FIG. 2 is a system block diagram showing one embodiment a scanning system in accordance with the present invention.

FIG. 2 depicts one embodiment of a scanning system 200 of the present invention that includes a scanner 202 connected to a network 204. The network 204 may consist of a server 206 and other workstations 208 that are configured to control or transmit and receive information to and from the scanner 202. Alternatively, the scanner 202 may be connected to the workstations 206 through the Internet 210 directly or indirectly through the computer network 204. One embodiment of the scanner 202 includes a tracking module 212, a prediction module 214, and a notification module 216.

Figure 3:
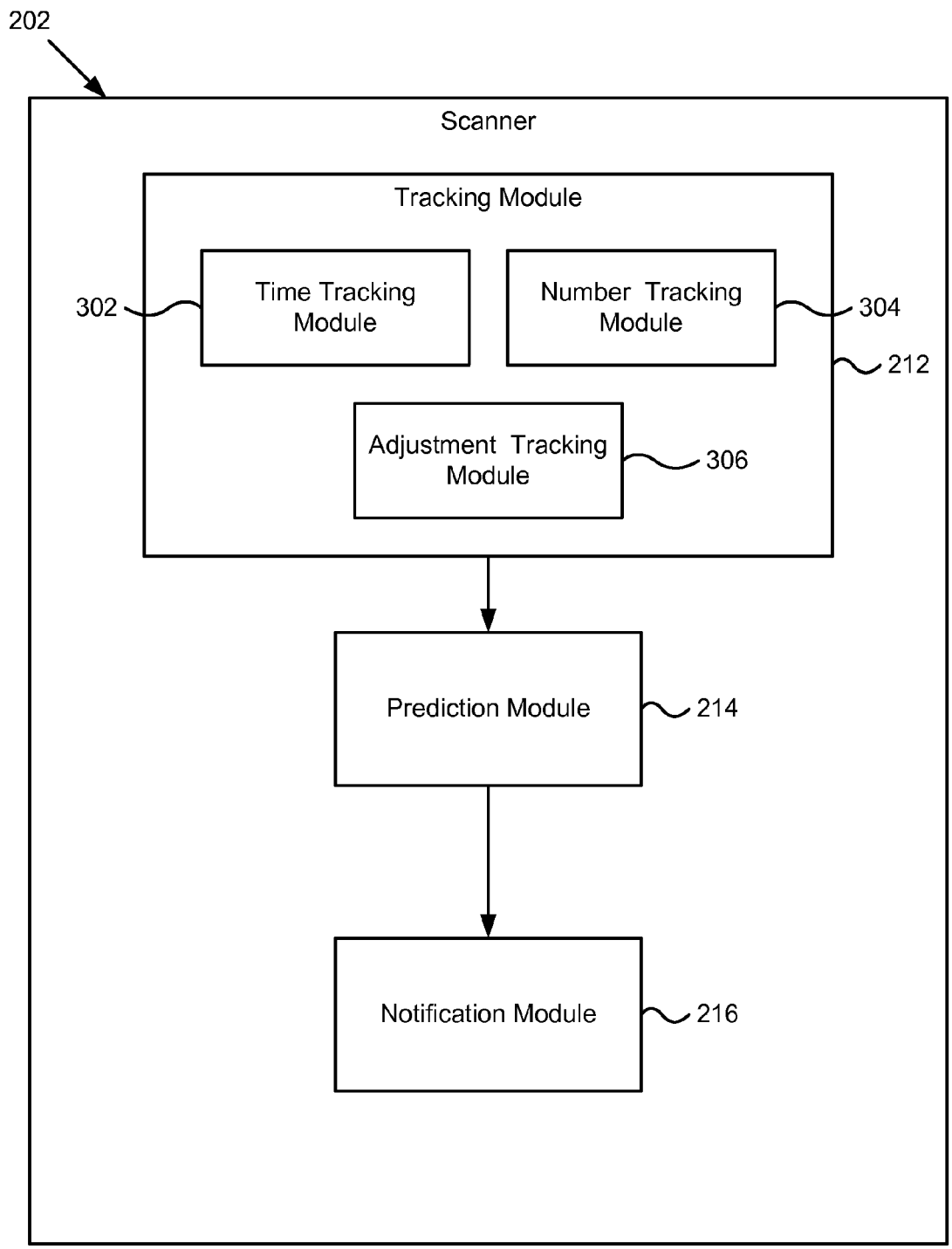
FIG. 3 is a schematic block diagram showing one embodiment of a scanning system in accordance with the present invention.

FIG. 3 is a more detailed depiction of a scanner 202 in accordance with the invention. This illustration of the scanner 202 includes one embodiment of the tracking module 212, configured to track a quality parameter history, a prediction module 214, configured to predict when maintenance is required based on the quality parameter history, and a notification module 216, configured to notify a user when maintenance is predicted to be required based on a quality parameter trend.

One embodiment of the tracking module 212 further comprises a time tracking module 302 configured to record a quality parameter history variable and a quality parameter time variable after a specified period of time. Another embodiment of the tracking module 212 further comprises a number tracking module 304 configured to record a quality parameter history variable and a quality parameter time variable after a specified number of images have been scanned. Another embodiment of the tracking module 212 further comprises an adjustment tracking module 306 configured to modify a history variable by an amount that a quality parameter variable is different than a quality parameter threshold and to record a quality parameter time variable when the quality parameter change variable is modified.

Figure 4:
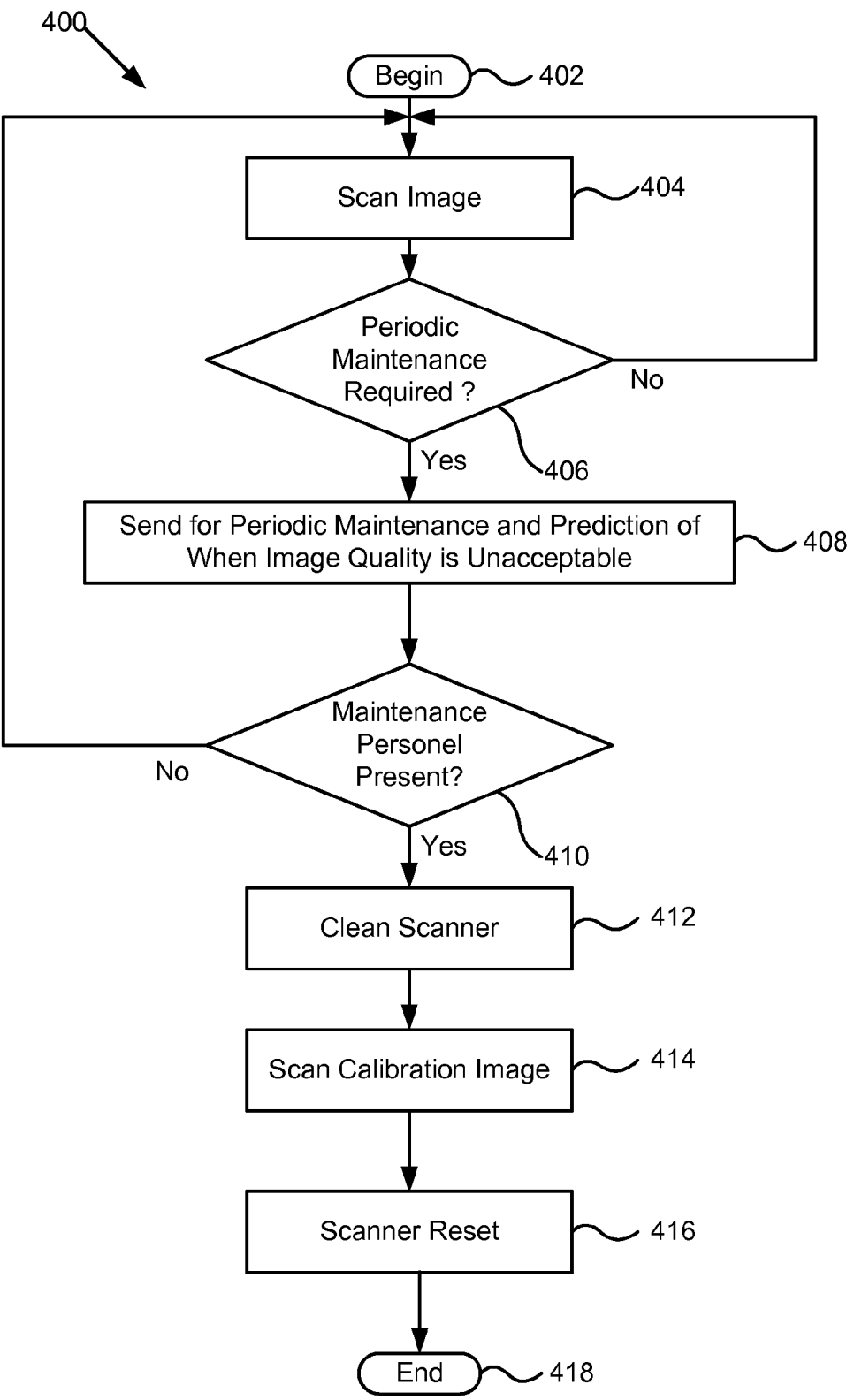
FIG. 4 is a schematic flow chart diagram illustrating the overall scanning process and a calibration process.

FIG. 4 is a schematic flow chart diagram illustrating one embodiment of the overall scanning and calibration process 400 in accordance with the present invention. The process begins 402 by scanning 404 an image. The scanner 202 then determines 406 if maintenance is required. If maintenance is not required, another image is scanned 402. If the scanner 202 determines that maintenance is required, the scanner 202 sends 408 a signal that maintenance is required along with a prediction of when image quality will be degraded to an unacceptable level. If a technician has not yet arrived to perform maintenance on the scanner 202, the process returns 410 for another image to be scanned. In one embodiment, one notification is sent and further notification is not sent again until the scanner 202 is reset by a technician. In another embodiment, a notification is sent a selected number of times until a technician resets the scanner 202.

Once a technician arrives, the scanner is cleaned 412, a calibration image is scanned 414, the scanner is reset 416, and the process ends 418. In one embodiment, when the scanner is reset, quality parameter history and notification variables are reset.

Figure 1:
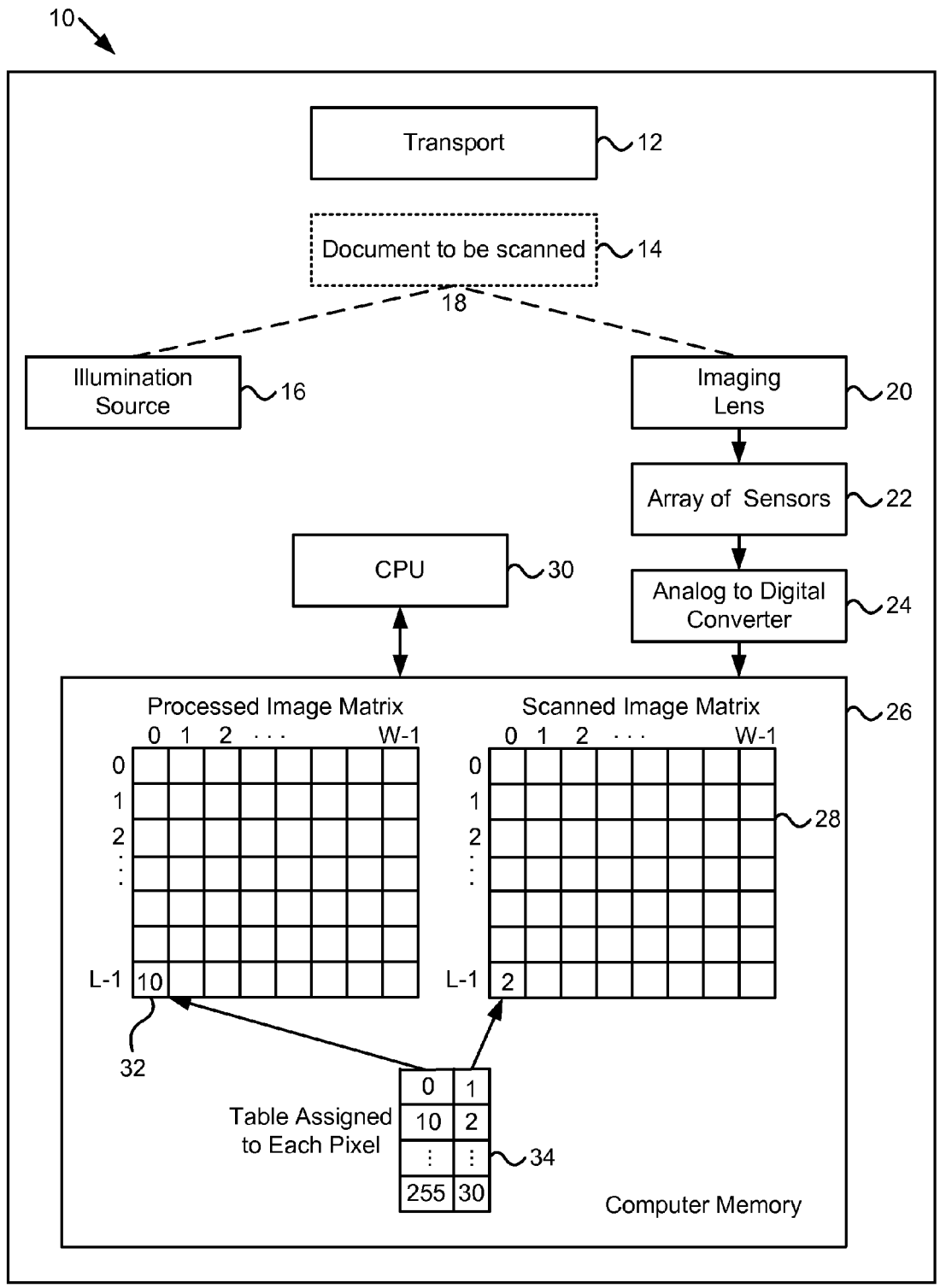
FIG. 1 is a schematic block diagram illustrating one embodiment of a conventional scanning device.
Figure 5:
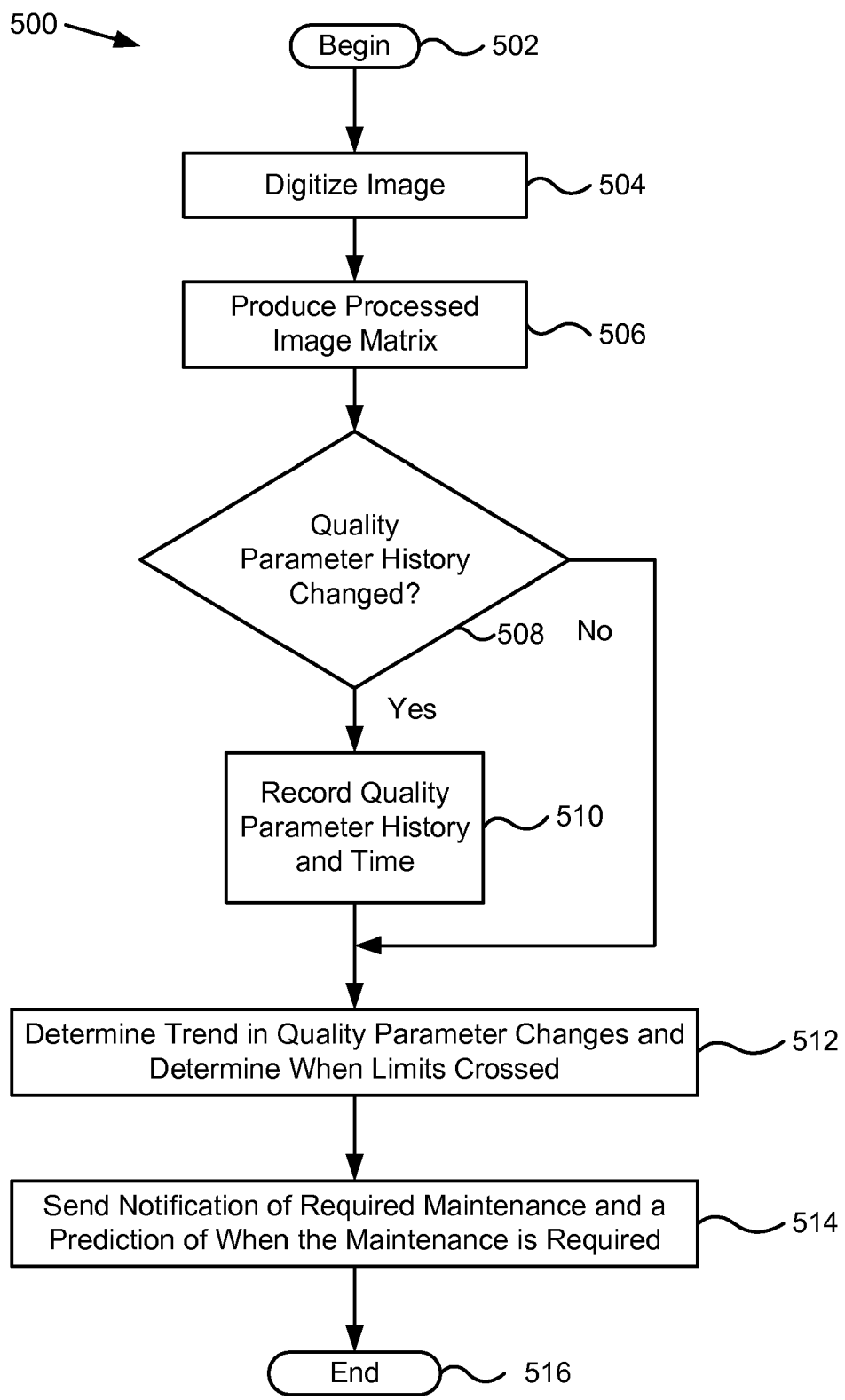
FIG. 5 is a schematic flow chart diagram illustrating one embodiment of a process for predicting maintenance in accordance with the present invention.

FIG. 5 depicts one embodiment of the scanning process 500 in accordance with the present invention. The process begins 502 and an image is digitized 504 as shown in FIG. 1 to produce a scanned image matrix 28. The scanned image matrix 28 is converted 506 to a processed image matrix. The conversion from a scanned image matrix 28 to a processed image matrix is well known to those skilled in the art and consists of comparing each element in the scanned image matrix 28 to the table assigned to each pixel 34 to produce the processed image matrix 32.

As successive documents 14 are scanned, the tracking module 212 tracks a quality parameter for each scanned image and also tracks a quality parameter history. If the quality parameter history changes 508, the tracking module 212 records 510 a quality parameter history variable and a quality parameter time variable.

Tracking when the quality parameter history variable is changed can take any number of forms. In one embodiment, the tracking module 212 records the quality history variable and a quality parameter time variable after an interval of time. In another embodiment, the tracking module 212 records the quality parameter history variable and quality parameter time variable after a specified number of documents 14 have been scanned.

In yet another embodiment, the tracking module 212 modifies a quality parameter history variable by an amount that a quality parameter variable is different than a quality parameter threshold and records a quality parameter time variable when the quality parameter change variable is modified. The quality parameter variable is then reset.

In another, more simple embodiment, the tracking module 212 tracks only the quality parameter and provides a notification when the quality parameter crosses a quality parameter notification limit. No prediction of when maintenance will be required can be calculated or sent in this embodiment.

The quality parameter can be any measurement of image quality. In one embodiment, the quality parameter is an average brightness and is calculated by dividing the sum of the brightness of each element of the processed image matrix 32 by a number of elements in the matrix. Alternatively, only a subset of elements representing the scanned document 14 is used, and the elements representing the transport 12 are not used.

In another embodiment, the quality parameter is maximum brightness. One embodiment of how a maximum brightness variable is obtained is to plot a histogram of all of the values of brightness in the processed image matrix and then to use a grouping of maximum brightness values as a maximum brightness variable. Using a grouping of maximum values rather than the maximum brightness of one pixel allows dismissal of a stray value of brightness that may be caused by noise. The number of pixels in the grouping can be adjusted to overcome noise. A maximum brightness history variable is reset at the time of calibration of the scanner 202 and then changes after every image is scanned. The amount that the maximum brightness history variable changes depends on the maximum brightness of the image being scanned.

In another embodiment, the quality parameter is video gradient. One embodiment of how video gradient is obtained is to plot a histogram of the difference, or gradient, from one element in the processed image matrix to a neighboring element. After all of the gradients are plotted, the maximum gradient is recorded and tracked as a video gradient variable. In one embodiment, in order to reduce the possibility of noise, a grouping of gradients is used instead of a single gradient value.

In one embodiment, the tracking module 212 tracks a video gradient history by using a video gradient history variable. When the video gradient variable for a scanned image is below a present value of the video gradient history variable, the video gradient history variable is decreased by a small amount. When the video gradient variable for a scanned image is above the present value of the video gradient history variable, the video gradient history variable is increased by a large amount.

In another embodiment, the quality parameter is contrast. One embodiment of how contrast is obtained is to find the maximum and minimum brightness of the document 14, and then contrast is calculated as the difference between the maximum and minimum brightness. A grouping of maximum brightness and a grouping of minimum brightness are used to reduce error due to noise.

In one embodiment, the tracking module 212 tracks a contrast history by using a contrast history variable. When the contrast variable for a scanned image is below a present value of the contrast history variable, the contrast history variable is decreased by a small amount. When the contrast variable for a scanned image is above the present value of the contrast history variable, the contrast history variable is increased by a large amount.

The prediction module 214 determines 512 a quality parameter trend and a prediction of when maintenance is required. One embodiment of the prediction module 214 is configured to use the quality parameter history variable and the quality parameter time variable from the tracking module 212 in a quality parameter function to determine a trend in quality parameter changes.

The output of the quality parameter function is used to extrapolate the changes to determine when the quality parameter trend will cross a quality parameter notification limit, when the quality parameter trend will cross a quality parameter change limit, and the time difference between when the quality parameter trend crosses the quality parameter notification limit and when the quality parameter trend crosses the quality parameter change limit.

One embodiment of the quality parameter function is a straight-line approximation function where the quality parameter change variable and quality parameter time variable are the inputs to the function and the output is a straight-line that most closely approximates the quality parameter changes as a function of time. Another embodiment of the quality parameter function is a first order curve fitting function where a first-order curve fitting function approximates the quality parameter changes as a function of time. Other more complex functions could be used as the quality parameter function.

The notification module 216 sends 514 a notification of required maintenance and a prediction of when the maintenance is required. One embodiment of the notification module 214 is further configured to send a notification signal when a quality parameter trend crosses a quality parameter notification limit. The notification signal may comprise an estimated time difference between when the quality parameter trend crosses the quality parameter notification limit and when the quality parameter trend crosses a quality parameter change limit. In another embodiment, the signal sent contains other scanner information such as location, type of quality parameter causing the notification, or any user definable message.

The quality parameter change limit is configured to be a determination of when quality of the scanned image is below acceptable limits. The quality parameter notification limit is configured to be sent before the estimated time that the quality parameter trend crosses the quality parameter change limit, preferably early enough that maintenance can be scheduled to minimize impact on scanner 202 usage.

In one embodiment, the signal sent from the notification module 214 is sent to a user interface on the scanner 202. In another embodiment, a signal is sent from the notification module 216 to a workstation 208 through a network 202. In another embodiment a signal is sent from the notification module 216 to a workstation 208 through the Internet 210.

Figure 6:
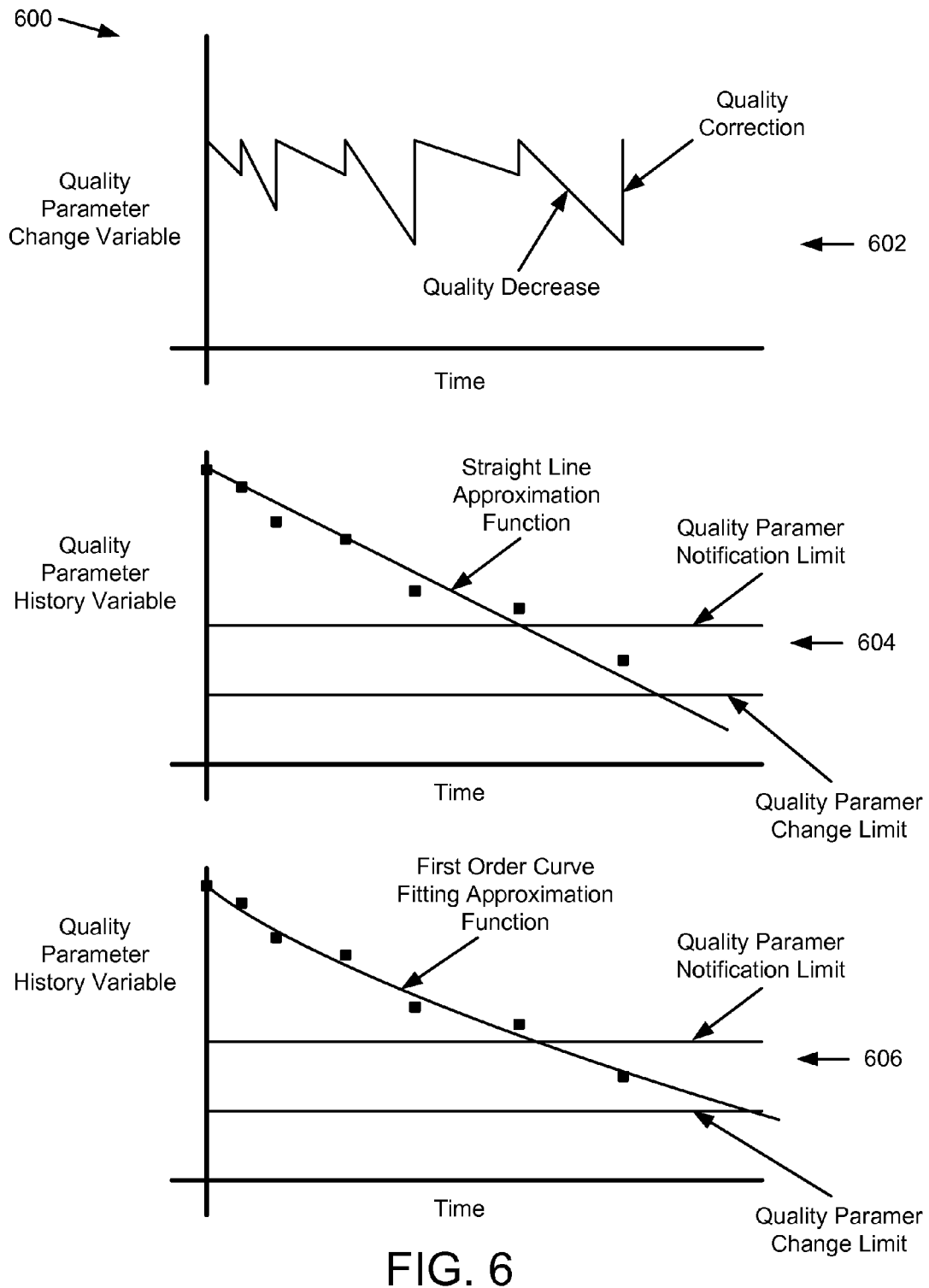
FIG. 6 is a graphical representation illustrating one embodiment of tracking a quality parameter in accordance with the present invention.

FIG. 6 is a graphical representation 600 of aspects of the previous process 500 for tracking image quality history and predicting maintenance. The first graph 602 represents one example of a quality parameter change variable and a quality parameter time variable as recorded in the adjustment tracking module 306. As the quality parameter change variable is decreased, a quality parameter threshold is crossed and a quality parameter history variable and quality parameter time variable are recorded. The quality parameter change variable is reset and the process is repeated.

The second graph 604 shows an example of the resulting discrete number of points where the quality parameter history is on the y-axis and the quality parameter time variable is on the x-axis. The points are used in a straight-line approximation function to plot a line. The straight-line approximation function is then extrapolated, and when the line crosses a quality parameter notification limit, a notification is sent. The signal sent includes a prediction of when maintenance is required. The prediction is based on the difference in time of when the line crosses the quality parameter notification limit and a quality parameter change limit representing the maximum change allowed before image quality is unacceptable. The third graph 606 is identical to the second graph 604, except the straight-line approximation function is replaced with a first order curve fit function.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for predicting when maintenance is required for a scanner, the apparatus comprising:
    a tracking module in a scanner, the tracking module configured to track a quality parameter history;
    a prediction module in the scanner, the prediction module configured to predict when maintenance is required based on the quality parameter history, wherein the prediction module is further configured to use a quality parameter history variable and a quality parameter time variable to determine a quality parameter trend and extrapolate the trend to determine when the quality parameter trend will cross a quality parameter limit; and
    a notification module in the scanner, the notification module configured to notify a user when maintenance is predicted to be required based on the quality parameter trend.

2. The apparatus of claim 1, wherein the tracking module further comprises a time tracking module configured to record a quality parameter history variable and a quality parameter time variable after a specified period of time.

3. The apparatus of claim 1, wherein the tracking module further comprises a number tracking module configured to record a quality parameter history variable and a quality parameter time variable after a specified number of images have been scanned.

4. The apparatus of claim 1, wherein the tracking module further comprises an adjustment tracking module configured to modify a quality parameter history variable by an amount that a quality parameter change variable is different than a quality parameter threshold and to record a quality parameter time variable when the quality parameter change variable is modified.

5. The apparatus of claim 1, wherein the prediction module is further configured to use the quality parameter history variable and the quality parameter time variable in a quality parameter function to determine the quality parameter trend and extrapolate the trend to determine:
   when the quality parameter trend will cross a quality parameter notification limit;
   when the quality parameter trend will cross a quality parameter change limit; and
   the difference between when the quality parameter trend crosses the quality parameter notification limit and the quality parameter change limit.

6. The apparatus of claim 5, wherein the quality parameter function comprises a quality parameter straight-line approximation function configured to determine a straight-line approximation of the quality parameter trend.

7. The apparatus of claim 5 wherein the quality parameter function comprises a quality parameter first order curve fitting approximation function configured to determine a curved-line approximation of the quality parameter trend.

8. The apparatus of claim 1, wherein the notification module is further configured to send a notification signal when a quality parameter trend crosses a quality parameter notification limit, the notification signal comprising an estimated time difference between when the quality parameter trend crosses the quality parameter notification limit and when the quality parameter trend crosses a quality parameter change limit.

9. The apparatus of claim 1, wherein the quality parameter is selected from a group consisting of an average brightness, a maximum brightness, a video gradient, and a contrast.

10. A system for predicting maintenance for a scanner, the system comprising:
   a computer network;
   a scanner configured to connect to a computer network and configured to scan images and convert the scanned image to a digital format each pixel of the scanned image corresponding to an element in a scanned image matrix;
   a server configured to control the computer network;
   a computer connected to the computer network, the computer configured to communicate with the scanner;
   a tracking module configured to track a quality parameter history;
   a prediction module configured to predict when maintenance is required based on quality parameter changes;
   the prediction module is further configured to use a quality parameter history variable and a quality parameter time variable in a quality parameter function to determine a quality parameter trend and extrapolate the trend to determine:
      when the quality parameter trend will cross a quality parameter notification limit;
      when the trend quality parameter trend will cross a quality parameter change limit; and
      the time difference between when the quality parameter trend will cross the quality parameter notification limit and the quality parameter change limit;
   a notification module configured to notify a user when maintenance is predicted to be required based quality parameter changes; and
   the notification module is further configured to send a notification signal when a quality parameter trend crosses a quality parameter notification limit, the notification signal comprising an estimated time difference between when the quality parameter trend crosses the quality parameter notification limit and when the quality parameter trend crosses a quality parameter change limit.

11. The apparatus of claim 10, wherein the quality parameter is selected from a group consisting of an average brightness, a maximum brightness, a video gradient, and a contrast.

12. A computer readable storage medium encoded with instructions capable of being executed by a computer, the instructions comprising computer readable code configured to carry out a process for predicting when maintenance is required for a scanner, the process comprising:
   tracking in a scanner a quality parameter history;
   predicting when maintenance is required in the scanner based on the quality parameter history; and
   notifying a user when maintenance is predicted to be required in the scanner based on a quality parameter trend, wherein notifying a user when maintenance is predicted to be required further comprises sending a notification signal when a quality parameter trend crosses a quality parameter notification limit, the notification signal comprising an estimated time difference between when the quality parameter trend crosses the quality parameter notification limit and when the quality parameter trend crosses a quality parameter change limit.

13. An apparatus for predicting maintenance in a scanner, the apparatus comprising:
   a tracking module of a scanner configured to track a quality parameter history of the scanner;
   a prediction module of the scanner configured to predict when maintenance is required in the scanner based on the quality parameter history; and
   a notification module of the scanner configured to notify a user when maintenance is predicted to be required in the scanner based on a quality parameter trend, wherein the notification module is further configured to send a notification signal when a quality parameter trend crosses a quality parameter notification limit, the notification signal comprising an estimated time difference between when the quality parameter trend crosses the quality parameter notification limit and when the quality parameter trend crosses a quality parameter change limit.

* * * * *